United States Patent
Jimichi et al.

(10) Patent No.: US 10,367,423 B1
(45) Date of Patent: Jul. 30, 2019

(54) POWER CONVERSION DEVICE

(71) Applicant: Mitsubishi Electric Corporation, Chiyoda-ku (JP)

(72) Inventors: Takushi Jimichi, Chiyoda-ku (JP); Nils Soltau, Aachen (DE); Murat Kaymak, Aachen (DE); Rik W. De Doncker, Aachen (DE)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/317,340

(22) PCT Filed: Jun. 22, 2017

(86) PCT No.: PCT/JP2017/022970
§ 371 (c)(1),
(2) Date: Jan. 11, 2019

(87) PCT Pub. No.: WO2018/051602
PCT Pub. Date: Mar. 22, 2018

(30) Foreign Application Priority Data

Sep. 16, 2016 (JP) .................................. 2016-181159

(51) Int. Cl.
*H02M 3/335* (2006.01)
*H02M 1/32* (2007.01)

(52) U.S. Cl.
CPC ......... *H02M 3/33507* (2013.01); *H02M 1/32* (2013.01); *H02M 3/335* (2013.01)

(58) Field of Classification Search
CPC .. H02M 1/32; H02M 1/36; H02M 2001/0032; H02M 3/335; H02M 3/33507;
(Continued)

(56) References Cited

U.S. PATENT DOCUMENTS

| 5,027,264 A | 6/1991 | Dedoncker et al. |
| 9,106,075 B2 * | 8/2015 | Tomas .................... H02M 1/32 |

(Continued)

FOREIGN PATENT DOCUMENTS

| EP | 2341594 A1 | 7/2011 |
| JP | 2004-15924 A | 1/2004 |

(Continued)

OTHER PUBLICATIONS

International Search Report dated Aug. 22, 2017, in PCT/JP2017/022970, filed Jun. 22, 2017.
(Continued)

*Primary Examiner* — Adolf D Berhane
*Assistant Examiner* — Shahzeb K Ahmad
(74) *Attorney, Agent, or Firm* — Oblon, McClelland, Maier & Neustadt, L.L.P.

(57) ABSTRACT

Each DC/DC converter includes a transformer, first and second switching circuits each formed of a plurality of legs having a plurality of semiconductor switching elements, capacitors, a discharge circuit connected in parallel to the secondary side capacitor, and a bypass switch for bypassing the capacitor. When detecting a malfunction in semiconductor switching elements, a control circuit turns OFF all of the semiconductor switching elements, and controls the bypass switch after discharge of the capacitor through the discharge circuit, so that the capacitor is bypassed.

20 Claims, 14 Drawing Sheets

(58) Field of Classification Search
CPC ......... H02M 3/33515; H02M 3/33538; H02M 3/33569; H02M 3/33576; H02M 3/33561; H02M 3/33584
See application file for complete search history.

(56) References Cited

U.S. PATENT DOCUMENTS

| | | | |
|---|---|---|---|
| 2008/0037295 A1* | 2/2008 | Suzuki | H02H 7/1227 363/40 |
| 2010/0091663 A1 | 4/2010 | Takeyama et al. | |
| 2010/0118453 A1 | 5/2010 | Dorn et al. | |
| 2013/0342139 A1* | 12/2013 | Shimomugi | H02M 7/066 318/400.3 |
| 2013/0343089 A1 | 12/2013 | Gupta et al. | |
| 2014/0210402 A1* | 7/2014 | Sakita | H02M 3/1584 320/107 |
| 2014/0211513 A1 | 7/2014 | Sakita | |
| 2015/0043253 A1* | 2/2015 | Awane | H02M 1/4258 363/37 |
| 2016/0036314 A1 | 2/2016 | Koyanagi et al. | |
| 2019/0028035 A1* | 1/2019 | Choi | H02M 3/33569 |

FOREIGN PATENT DOCUMENTS

| | | |
|---|---|---|
| JP | 2010-41918 A | 2/2010 |
| JP | 2014-147256 A | 8/2014 |
| JP | 2015-527032 A | 9/2015 |
| WO | WO2008/114777 A1 | 9/2008 |
| WO | WO 2008/125494 A1 | 10/2008 |
| WO | WO2014/148100 A1 | 9/2014 |

OTHER PUBLICATIONS

De Doncker, R. et al., "A Three-Phase Soft-Switched High-Power-Density dc/dc Converter for High-Power Applications", IEEE Transactions on Industry Applications, vol. 27, No. 1, Jan./Feb. 1991, pp. 63-73.

* cited by examiner

POWER CONVERSION DEVICE

TECHNICAL FIELD

The present invention relates to a power conversion device that converts DC power to DC power by using a plurality of insulation-type converters.

BACKGROUND ART

As a conventional power conversion device that converts DC power to DC power, a power conversion device has been proposed wherein two single-phase full-bridge circuits that include semiconductor switching elements and perform power conversion between DC power and AC power are used, and AC terminals of the respective single-phase full-bridge circuits are connected via a transformer. Accordingly, the primary side and the secondary side are insulated from each other, whereby a power conversion device capable of performing DC/DC conversion is implemented.

Alternatively, two three-phase bridge converters are used instead of the single-phase full-bridge circuits, and AC terminals of the respective three-phase bridge converters are connected via a three-phase transformer, whereby a power conversion device capable of performing DC/DC conversion is also implemented (see Patent Document 1, for example).

Further, as a conventional power conversion device using a plurality of insulation-type converters, a power conversion device including a plurality of power electronics modules which are substantially identical to one another, has been proposed. Each of the power electronics modules includes a single-phase DC/AC inverter with an output side and an insulation type DC/DC converter with an input side. The insulation type DC/DC converters are continuously connected to the corresponding single-phase DC/AC inverters so as to share DC link capacitors. In the structure in which the plurality of power electronics modules are connected in series, any malfunctioning module is bypassed with use of a bypass switch so that the remaining modules are operated (see Patent Document 2, for example).

CITATION LIST

Patent Document

Patent Document 1: U.S. Pat. No. 5,027,264
Patent Document 2: Japanese Laid-Open Patent Publication No. 2015-527032

SUMMARY OF THE INVENTION

Problems to be Solved by the Invention

In the above power conversion device disclosed in Patent Document 2, since a malfunctioning module among the plurality of modules is bypassed with use of the bypass switch, the operation can be continued even when a malfunction has occurred. However, when DC/DC converters such as single-phase full-bridge converters or three-phase bridge converters as described in Patent Document 1 are used for the plurality of modules, a DC capacitor is short-circuited by the bypass switch and the bypass switch is damaged. Therefore, a malfunctioning DC/DC converter cannot be bypassed. This causes a problem that the operation cannot be continued.

The present invention has been made to solve the above problem, and an object of the present invention is to continue the operation of a power conversion device having a plurality of DC/DC converters, secondary side terminals of which are connected in series, without halting the operation even when a malfunction has occurred.

Solution to the Problems

A power conversion device according to the present invention has a plurality of DC/DC converters, primary side terminals of which are connected in parallel and secondary side terminals of which are connected in series. The DC/DC converters each include: a transformer; a first switching circuit formed of a bridge circuit including a plurality of legs having a plurality of semiconductor switching elements to which antiparallel diodes are respectively connected, the first switching circuit being connected between the primary side terminals and a primary winding of the transformer so as to perform DC/AC power conversion; a second switching circuit formed of a bridge circuit including a plurality of legs having a plurality of semiconductor switching elements to which antiparallel diodes are respectively connected, the second switching circuit being connected between the secondary side terminals and a secondary winding of the transformer so as to perform DC/AC power conversion; a capacitor connected in parallel to the secondary side terminals; and a control circuit for controlling an output of the corresponding DC/DC converter.

Each of the DC/DC converters further includes a discharge circuit connected in parallel to the capacitor so as to discharge power of the capacitor, a bypass switch for bypassing the capacitor by causing a short-circuit between the secondary side terminals, and a malfunction detection unit which is provided in a gate drive circuit of at least one of the semiconductor switching elements of each of the legs in the first and second switching circuits and which detects a malfunction in the semiconductor switching element.

In each of the DC/DC converters, when the malfunction detection unit detects the malfunction in the semiconductor switching element, the control circuit turns OFF all the semiconductor switching elements in the first switching circuit, and controls the bypass switch to a conductive state after discharge of the capacitor through the discharge circuit, so as to cause a short circuit between the secondary side terminals.

Effect of the Invention

According to the power conversion device of the present invention, in the DC/DC converter where a malfunction has been detected, a short circuit is caused between the secondary side terminals after the capacitor connected in parallel to the secondary side terminals is discharged through the discharge circuit. Therefore, the malfunctioning DC/DC converter can be reliably bypassed, whereby power conversion can be reliably continued even when a malfunction has occurred.

DESCRIPTION OF EMBODIMENTS

First Embodiment

Hereinafter, the first embodiment of the present invention is described.

Figure 1:
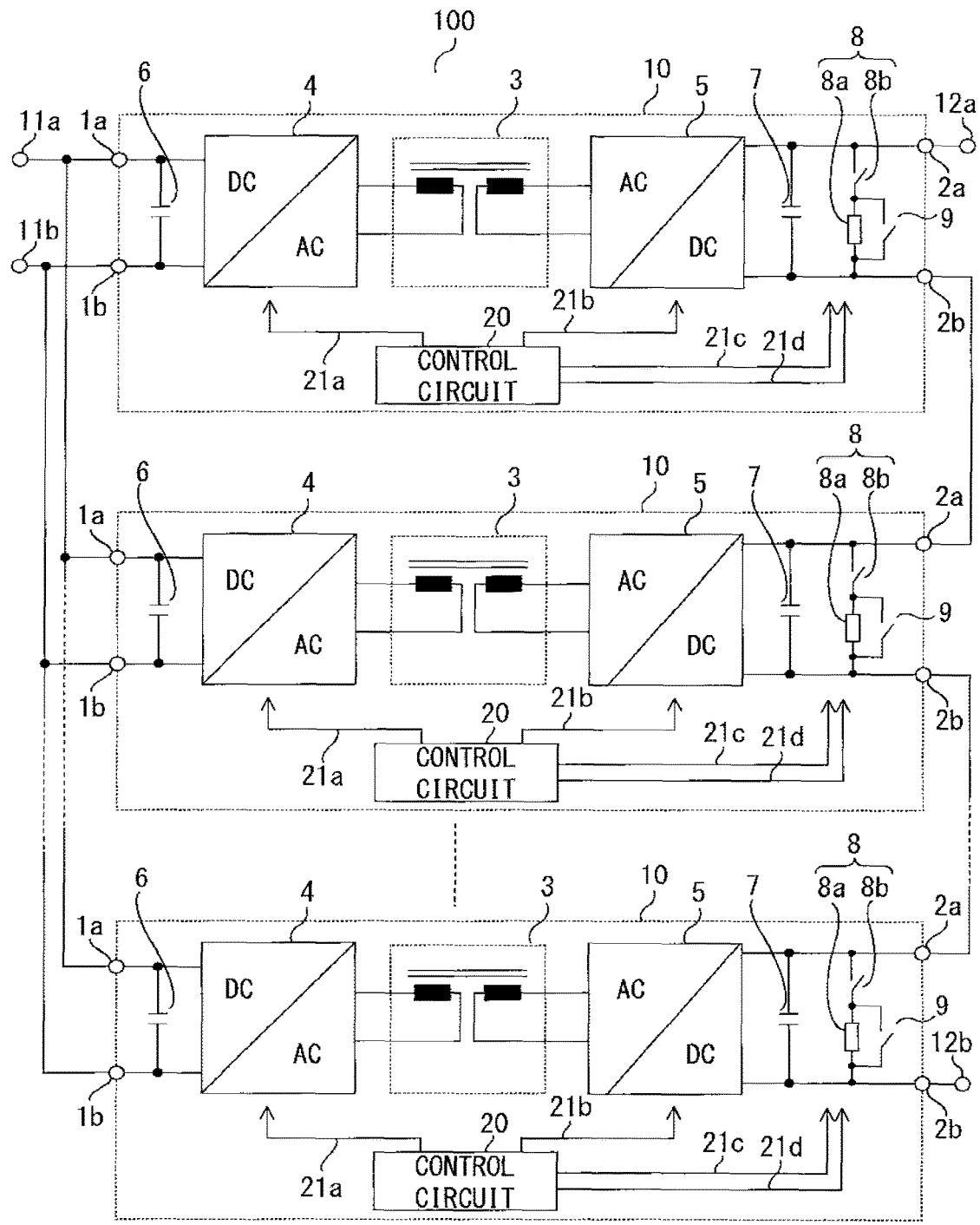
FIG. 1 is a schematic configuration diagram showing a power conversion device according to the first embodiment of the present invention.

FIG. 1 is a diagram showing the schematic configuration of a power conversion device according to the first embodiment of the present invention. As shown in FIG. 1, the power conversion device 100 includes, as DC/DC converters, a plurality of submodules 10 between primary side DC terminals 11a, 11b and secondary side DC terminals 12a, 12b. The plurality of submodules 10 are connected to the primary side DC terminals 11a, 11b with primary side terminals 1a, 1b connected in parallel thereto, and secondary side terminals 2a, 2b are connected in series between the secondary side DC terminals 12a, 12b.

Since the submodules 10 are connected in parallel at the primary side, as described above, the power conversion device 100 can handle large-current power. Since the submodules 10 are connected in series at the secondary side, the power conversion device 100 can handle high-voltage power. Further, low-voltage DC power can be converted to high-voltage DC power.

It is noted that the number of the submodules 10 only needs to be two or more.

Each of the submodules 10 includes: a transformer 3; a first switching circuit 4 that is connected between the transformer 3 and the primary side terminals 1a, 1b and that performs DC/AC power conversion; a second switching circuit 5 that is connected between the transformer 3 and the secondary side terminals 2a, 2b and that performs DC/AC power conversion; a capacitor 6 that is connected in parallel to the primary side terminals 1a, 1b; a capacitor 7 that is connected in parallel to the secondary side terminals 2a, 2b; a discharge circuit 8 formed of a series body including a resistance 8a and a discharge switch 8b; and a bypass switch 9. Each of the submodules 10 further includes a control circuit 20. The control circuit 20 generates drive signals 21a, 21b to control the first switching circuit 4 and the second switching circuit 5, and also generates control signals 21c, 21d to control the conductive state of the discharge switch 8b in the discharge circuit 8 and the conductive state of the bypass switch 9.

The submodules 10 are thus configured to perform power conversion between the primary side and the secondary side. It is noted that the power transmission direction may be freely controlled.

In this case, the control circuits 20 of the respective submodules 10 are illustrated near the main circuit configurations of the corresponding submodules 10 in FIG. 1. However, the arrangement is not limited thereto. For example, the control circuits 20 for the plurality of submodules 10 may be collectively arranged.

Hereinafter, when the submodules 10 are illustrated, illustration of the control circuits 20 is omitted for convenience, unless otherwise required.

Figure 2:
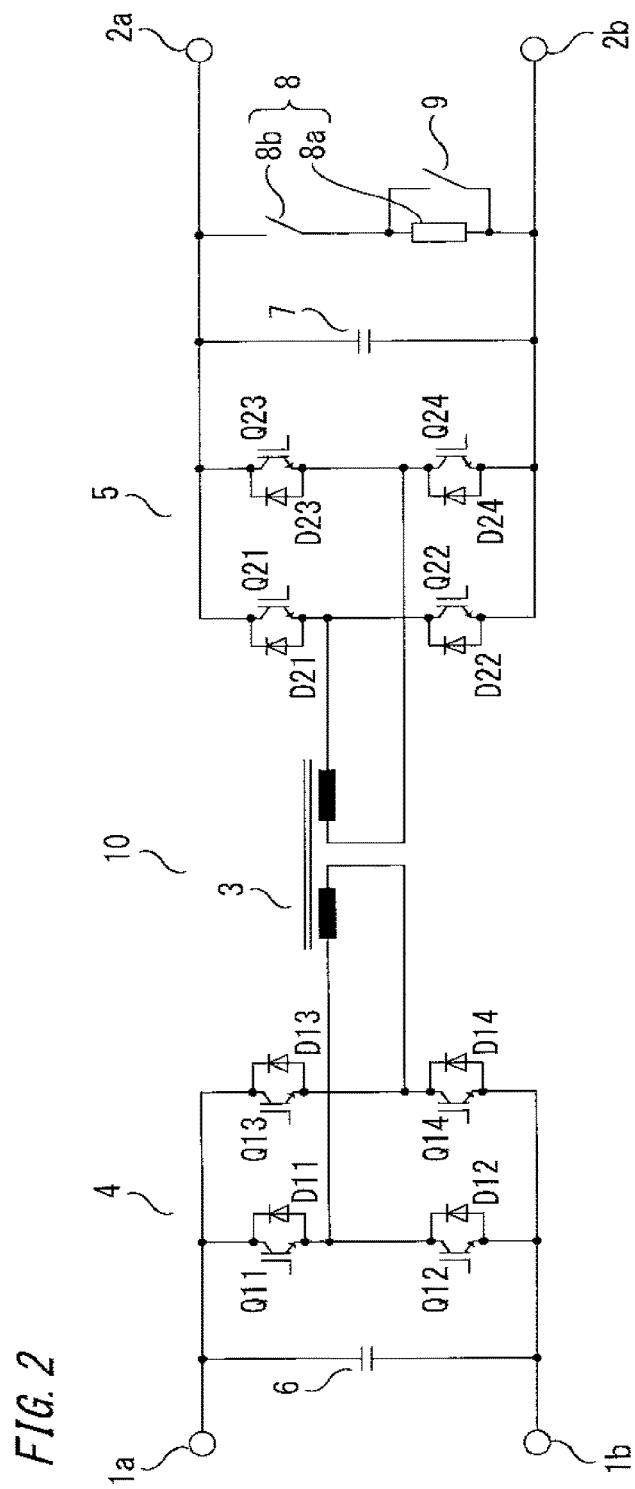
FIG. 2 is a circuit diagram showing the configuration of a submodule according to the first embodiment of the present invention.

FIG. 2 is a circuit diagram showing the detailed configuration of a submodule 10.

The first switching circuit 4 is a single-phase full-bridge circuit including a plurality of semiconductor switching elements Q11 to Q14 (hereinafter, simply referred to as Q11 to Q14 or semiconductor switching elements Q1) to which diodes D11 to D14 are connected in antiparallel, respectively. Each phase thereof is formed of two legs (Q11, Q12), (Q13, Q14) each obtained by connecting two semiconductor switching elements Q1 in series. Both ends (DC ends) of each of the legs are connected to the capacitor 6, and the intermediate point (AC end) of each of the legs is connected to a primary winding of the transformer 3.

The second switching circuit 5 is a single-phase full-bridge circuit including a plurality of semiconductor switching elements Q21 to Q24 (hereinafter, simply referred to as Q21 to Q24 or semiconductor switching elements Q2) to which diodes D21 to D24 are connected in antiparallel, respectively. Each phase thereof is formed of two legs (Q21, Q22), (Q23, Q24) each obtained by connecting two semiconductor switching elements Q2 in series. Both ends (DC ends) of each of the legs are connected to the capacitor 7, and an intermediate point (AC end) of each of the legs is connected to a secondary winding of the transformer 3.

The transformer 3 has respective leakage inductances at the primary side and the secondary side. By using the leakage inductances, the first switching circuit 4 and the second switching circuit 5 each perform DC/AC power conversion.

It is noted that inductances for use in power conversion are not limited to the leakage inductances of the transformer 3, and additional inductance may be connected.

The ratio of number of turns of the transformer 3 preferably matches the ratio between the voltage of the capacitor 6, which is the primary side DC voltage, and the voltage of the capacitor 7, which is the secondary side DC voltage. For example, when the input voltage and the output voltage of the submodule 10 are 1 kV and 3 kV, respectively, the ratio of numbers of turns of the transformer 3 is set to 1:3.

In addition, the discharge circuit 8 formed of the series body including the resistance 8a and the discharge switch 8b is connected in parallel to the secondary side capacitor 7. Further, the bypass switch 9 is connected in parallel to the resistance 8a of the discharge circuit 8.

Furthermore, self-arc-extinguishing type semiconductor switching elements such IGBTs (Insulated Gate Bipolar Transistors), GCTs (Gate Commutated Turn-off thyristors), or MOSFETs (Metal Oxide Semiconductor Field Effect Transistors) are used for the semiconductor switching elements Q1, Q2 in the first and second switching circuits 4, 5. It is noted that each of the semiconductor switching elements Q1, Q2 may be obtained by connecting a plurality of elements in parallel according to the current capacity.

Moreover, the semiconductor switching elements Q2 in the second switching circuit 5 are desirably configured to have an explosion proof structure. The explosion proof structure prevents, even when a semiconductor switching element Q2 has malfunctioned (for example, exploded), broken pieces scattered due to the malfunction from damaging the remaining semiconductor elements. Specifically, for example, each semiconductor module in the semiconductor switching elements Q2 is covered with a material, such as a metal or a resin, etc., having a high mechanical strength.

Also, electrolytic capacitors or film capacitors, etc. can be used for the capacitors 6, 7. Since high-frequency currents flow through the capacitors 6, 7, life prolongation can be achieved by use of film capacitors.

A gate drive circuit for driving a gate is provided to each of the semiconductor switching elements Q1, Q2.

Figure 3A:
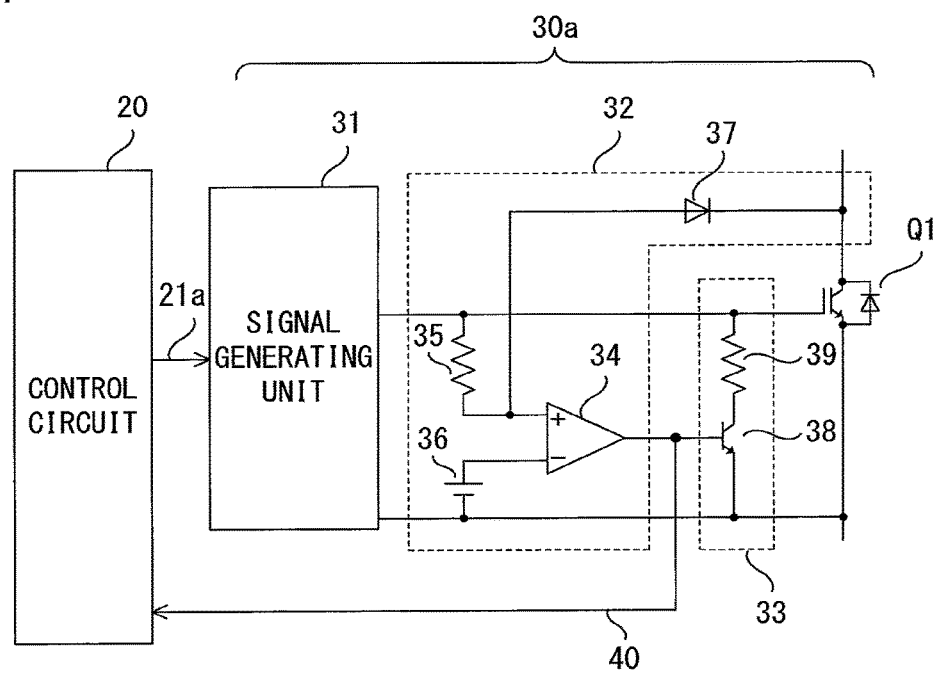
FIGS. 3A and 3B are circuit diagrams showing configuration examples of gate driving circuits according to the first embodiment of the present invention.
Figure 3B:
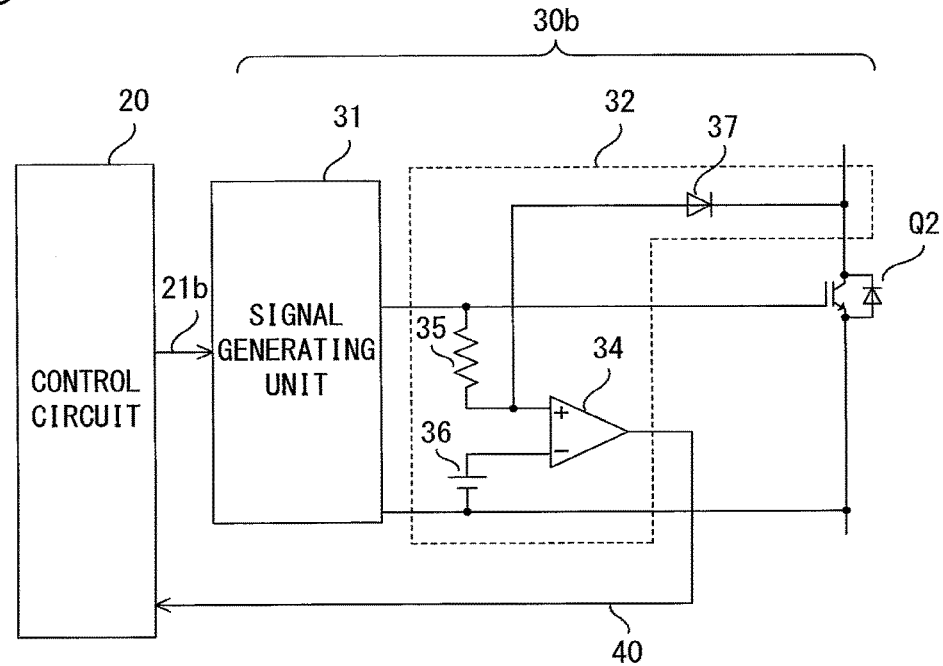
Figure 4:
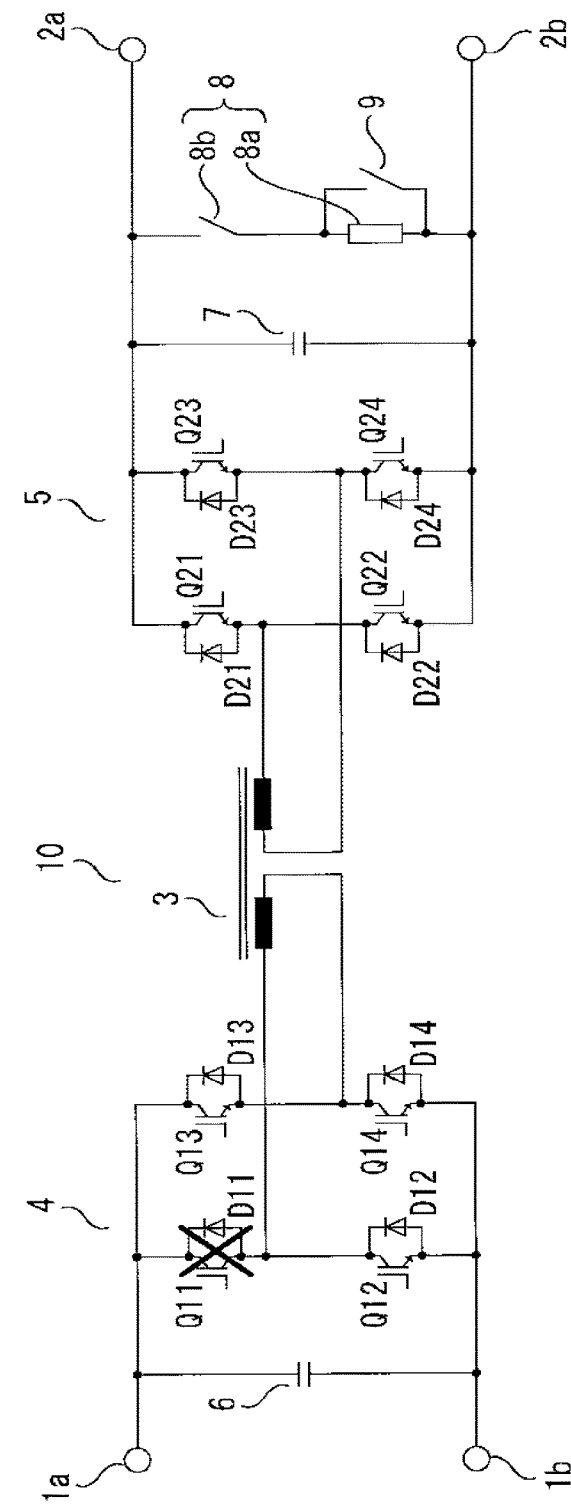
FIG. 4 is a circuit diagram illustrating a part of operation to be performed when a submodule has malfunctioned according to the first embodiment of the present invention.

FIGS. 3A and 3B show examples of the gate drive circuits of the semiconductor switching elements Q1, Q2 in the first and second switching circuits 4, 5. FIG. 3A shows a gate driving circuit 30a of each of the semiconductor switching elements Q1 in the first switching circuit 4, and FIG. 3B shows a gate driving circuit 30b of each of the semiconductor switching elements Q2 in the second switching circuit 5.

As shown in FIG. 3A, the gate driving circuit 30a of each of the semiconductor switching elements Q1 in the first switching circuit 4 includes: a signal generation unit 31 for generating a gate signal on the basis of the drive signal 21a from the control circuit 20; a malfunction detection unit 32 for detecting a malfunction in the semiconductor switching element Q1; and a blocking unit 33 for blocking the semiconductor switching element Q1 when the malfunction has been detected.

The malfunction detection unit 32 includes a comparator 34, a resistance 35, a reference voltage 36, and a diode 37, and detects a short-circuit current caused by a malfunction in the semiconductor switching element Q1. When an arm short circuit has occurred in a leg of the semiconductor switching element Q1 while the semiconductor switching element Q1 is in an ON state, the voltage of the capacitor 6 is applied to both ends of the semiconductor switching element Q1 so that the collector-emitter voltage is increased. It is noted that the drop voltage between the collector and the emitter is a few volts when no arm short circuit has occurred. The malfunction detection unit 32 detects the collector potential of the semiconductor switching element Q1 according to the potential of the connection point between the resistance 35 and the diode 37, and detects a short-circuit current by comparing, at the comparator 34, the collector potential with the reference voltage 36. A detection signal 40 which is an output from the comparator 34 is transmitted to the control circuit 20, and is inputted to the blocking unit 33.

The blocking unit 33 is formed of a series circuit including the switch 38 and the resistance 39. The detection signal 40 which is an output from the comparator 34 drives the switch 38. Namely, when the malfunction detection unit 32 detects a short-circuit current, the detection signal 40 turns ON the switch 38 of the blocking unit 33 so that the semiconductor switching element Q1 is blocked.

It is noted that the resistance 39 of the blocking unit 33 sets a resistance value to be larger, compared to a resistance (not illustrated) which is used to perform normal OFF control of the semiconductor switching element Q1. As a result, soft blocking of suppressing a surge voltage, which is generated at the time of blocking, can be performed.

The malfunction detection unit 32 and the blocking unit 33 in the gate driving circuit 30a each have a function which is generally called "arm short-circuit protection".

When one of the semiconductor switching elements in one leg has malfunctioned, the conductive state of the malfunctioning semiconductor switching element is continued, and the capacitor is short-circuited at the time of turning ON of the other sound semiconductor switching element, whereby a large overcurrent is generated. When such an overcurrent continues for 10 μs, the sound semiconductor switching element also malfunctions and the conductive state thereof is continued. Thus, the capacitor is continuously short-circuited.

In the "arm short circuit protection", such an overcurrent is detected, and thereby, a malfunction in a semiconductor switching element is detected, and a sound semiconductor switching element is turned OFF before malfunctioning. Accordingly, the sound semiconductor switching element is protected from the overcurrent so that the short-circuited state of the capacitor is eliminated.

Also, as shown in FIG. 3B, the gate driving circuit 30b of each of the semiconductor switching elements Q2 in the second switching circuit 5 includes the signal generation unit 31 that generates a gate signal on the basis of the drive signal 21b from the control circuit 20, and the malfunction detecting unit 32 that detects a malfunction in the semiconductor switching element Q2. The gate driving circuit 30b includes the signal generation unit 31 and the malfunction detection unit 32 identical to those of the gate driving circuit 30a.

It is noted that, when the secondary side capacitor 7 is discharged and bypassed as described below, no trouble is caused by a leg that is in a short-circuited state in the second switching circuit 5. Accordingly, the blocking unit 33 may be omitted. In this case, a circuit including no blocking unit 33 is used so that downsizing and weight reduction can be achieved.

It is noted that, when a leg is short-circuited in the second switching circuit 5, all the energy stored in the capacitor 7 flows into the semiconductor switching elements Q2 of the short-circuited leg. Thus, the semiconductor switching elements Q2 may explode. As described above, the explosion proof structure is used for the semiconductor switching elements Q2 in the second switching circuit 5, whereby any damage to other elements and components can be prevented.

Next, the operation of a submodule 10 is described below.

The control circuit 20 in the submodule 10 generates the drive signals 21a, 21b and controls the ON/OFF of the semiconductor switching elements Q1, Q2 in the first and second switching circuits 4, 5 so that transmission power can be controlled. As control during a normal operation, known phase shift control is used, for example. Such a control method during a normal operation is disclosed in the non-patent document "R. W. A. A. De Doncker, D. M. Divan, and M. H. Kheraluwala, "A Three-phase Soft-Switched High-Power-Density dc/dc Converter for High-Power Applications" IEEE Transactions on Industry Applications, vol. 27, no. 1, January/February, 1991.", for example. Thus, a detailed explanation of the control method is omitted.

In the present embodiment, during an abnormal time when semiconductor switching elements included in some of the plurality of submodules 10 constituting the power conversion device 100 have malfunctioned, the operation is continued with use of the remaining sound submodules 10. Therefore, in each of the submodules 10, when the control circuit 20 detects a malfunction in the submodule 10, the control circuit 20 performs control to disconnect the input and output of the submodule 10 from the entire power conversion device 100 so as to be bypassed, as described in detail later.

First, the operation desired when a malfunction in the semiconductor switching elements Q1, Q2 has been detected is described below.

The primary sides of the plurality of submodules 10 in the power conversion device 100 are connected in parallel. Therefore, when an arm short circuit due to the malfunction has occurred in a leg in any of the submodules 10, the primary side terminals 1a, 1b of the remaining sound submodules 10 may also be short-circuited. Namely, since the terminal voltages at the primary side DC terminals 11a, 11b become zero, the operation cannot be continued.

For this reason, all the primary side legs of the submodule 10 including a malfunctioning semiconductor switching element Q1, Q2 are opened (turned off), whereby the input and output on the primary side are disconnected from the entire power conversion device 100. Namely, in the submodule 10 where a malfunction has been detected, the control circuit 20 turns OFF all the first semiconductor switching elements Q1 of the first switching circuit 4. It is noted that current to a semiconductor switching element Q1, the ON state of which is continued because it cannot be turned OFF due to the malfunction, is cut off by turning OFF of the other semiconductor switching elements Q1.

Furthermore, the secondary sides of the plurality of submodules 10 in the power conversion device 100 are connected in series. Since the voltage of the secondary side capacitor 7 of a malfunctioning submodule 10 cannot be controlled, the operation cannot be continued with use of the remaining submodules 10 in the state where the secondary side terminals 2a, 2b of the malfunctioning submodule 10 are connected in series.

For this reason, a short circuit between the secondary side terminals 2a, 2b of the malfunctioning submodule 10 is caused to bypass the capacitor 7, whereby the secondary side input and output are disconnected from the entire power conversion device 100. However, the control circuit 20 causes the discharge circuit 8 to discharge the capacitor 7 prior to bypassing of the capacitor 7.

The discharge switch 8b in the discharge circuit 8 and the bypass switch 9 are in open states during the normal operation of the submodule 10. When a malfunction is detected in the semiconductor switching elements Q1, Q2, the control circuit 20 controls the discharge switch 8b to a conductive state by using the control signal 21c. Accordingly, the resistance 8a is connected to the capacitor 7, and the capacitor 7 is discharged. After completion of discharge of the capacitor 7, the control circuit 20 controls the bypass switch 9 to a conductive state by using the control signal 21d. Accordingly, the resistance 8a is bypassed, a short-circuit is caused between the secondary side terminals 2a, 2b via the discharge switch 8b and the bypass switch 9, and thus, the capacitor 7 is bypassed.

As described above, the capacitor 7 is bypassed after being discharged. Therefore, energy stored in the capacitor 7 is prevented from flowing into the bypass switch 9 and damaging the bypass switch 9.

For the discharge switch 8b and the bypass switch 9, mechanical switches or semiconductor switches are used. Since the discharge switch 8b and the bypass switch 9 are maintained in the conductive states when the submodule 10 has malfunctioned, the discharge switch 8b and the bypass switch 9 are preferably normally ON or preferably have a function of being latched on the conductive state.

Next, a series of operations to be performed when a malfunction has occurred in a semiconductor switching element included in a submodule 10 is described with reference to FIGS. 4 to 7. It is noted that a mark "X" on a semiconductor switching element in the drawings indicates that the semiconductor switching element has a malfunction.

Figure 5:
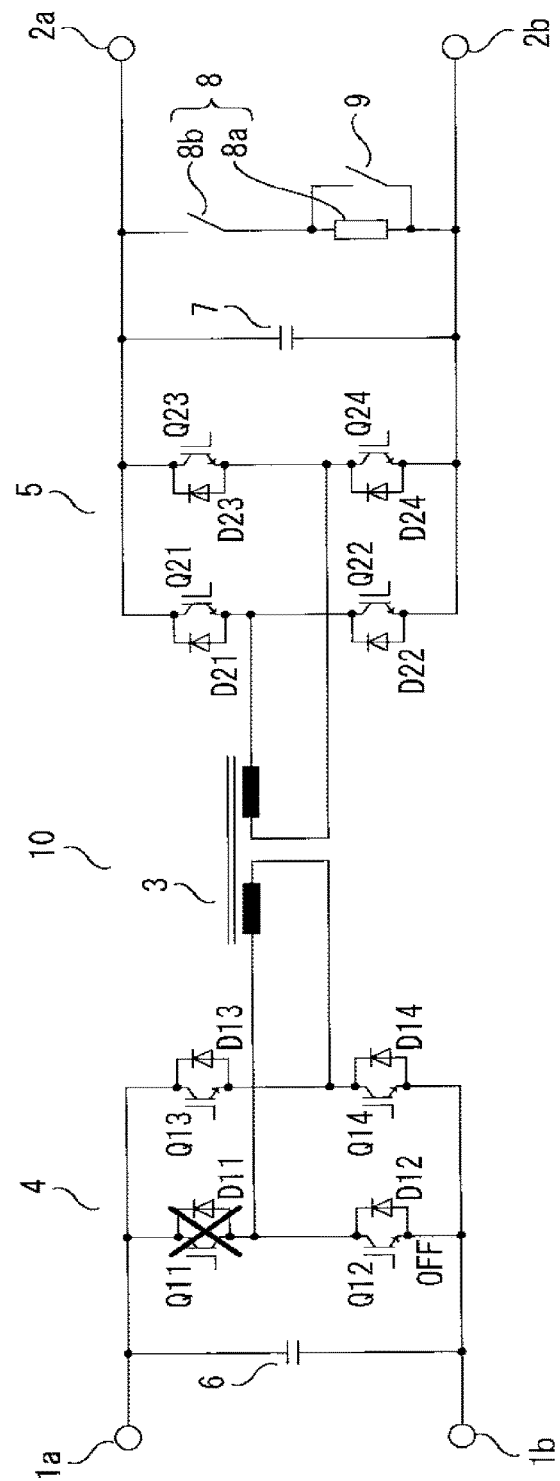
FIG. 5 is a circuit diagram illustrating a part of operation to be performed when a submodule has malfunctioned according to the first embodiment of the present invention.

When a malfunction has occurred in Q11 of the first switching circuit 4 during the normal operation of the submodule 10 (FIG. 4), the malfunction detection unit 32 of the gate driving circuit 30a of Q12 connected in series with Q11 detects a short-circuit current, and transmits the detection signal 40 to the control circuit 20, and then Q12 is shifted to an OFF operation (soft shutoff) (FIG. 5).

Figure 6:
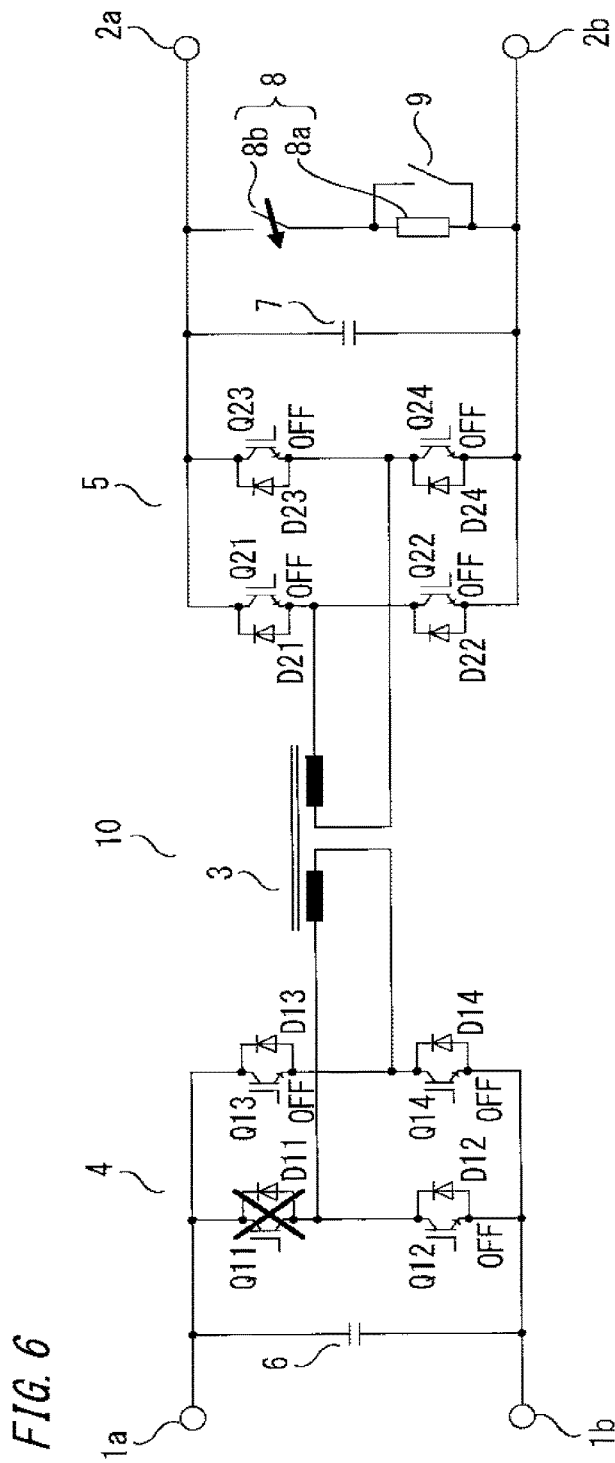
FIG. 6 is a circuit diagram illustrating a part of operation to be performed when a submodule has malfunctioned according to the first embodiment of the present invention.

The control circuit 20 receives the detection signal 40, determines that the submodule 10 has malfunctioned, controls all the semiconductor switching elements Q1, Q2 to OFF states, and controls the discharge switch 8b in the discharge circuit 8 to a conductive state. As a result, the capacitor 7 is discharged through the discharge circuit 8 (FIG. 6). It is noted that the semiconductor switching elements Q2 in the second switching circuit 5 does not need to be controlled to the OFF states.

Figure 7:
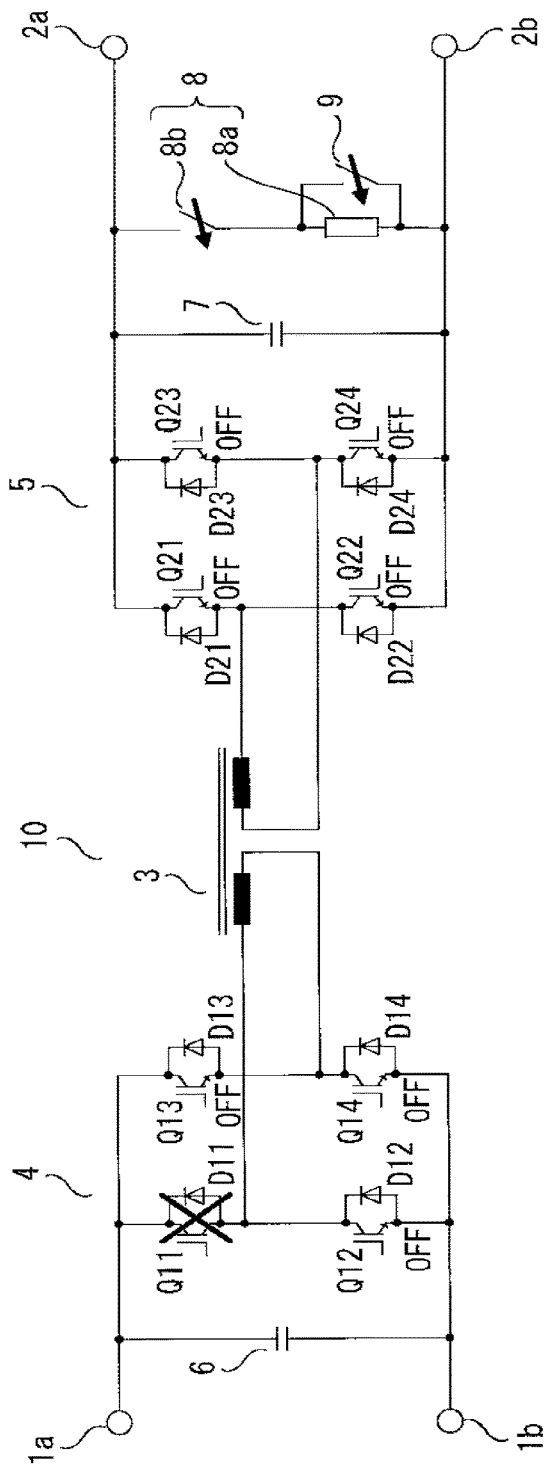
FIG. 7 is a circuit diagram illustrating a part of operation to be performed when a submodule has malfunctioned according to the first embodiment of the present invention.

When discharge of the capacitor 7 is completed, the control circuit 20 controls the bypass switch 9 to the conductive state. As a result, both the discharge switch 8b and the bypass switch 9 are in the conductive states so that a bypass route is formed. The bypass route causes a short circuit between the secondary side terminals 2a, 2b, and thus, the capacitor 7 is bypassed. Then, the OFF states of the semiconductor switching elements Q1 in the first switching circuit 4 are continued (FIG. 7).

It is noted that, when one of the submodules 10 malfunctions, the DC voltages at the secondary side terminals 2a, 2b thereof become zero so that power cannot be transmitted. For this reason, when the submodule 10 malfunctions, the remaining sound submodules 10 operate so as to compensate for the output voltage or transmission power of the malfunctioning submodule 10.

For example, when the total number of the submodules 10 is n and the total number of malfunctioning submodules 10 is m (m<n), the terminal voltages at the secondary side DC terminals 12a, 12b of the power conversion device 100 are (n−m)/n times of the terminal voltages which are obtained when no malfunction has occurred, and the transmission power of the power conversion device 100 is also (n−m)/n times of the transmission power obtained when no malfunction has occurred. Accordingly, when m submodules 10 have malfunctioned, respective voltage command values for the secondary side terminals 2a, 2b of the remaining (n−m) sound submodules 10 are controlled to be n/(n−m) times, or the respective power command values therefor are controlled to be n/(n−m) times. Consequently, the power conversion device 100 can continue a desired operation.

With reference to FIGS. 4 to 7, the case where a malfunction has occurred in the semiconductor switching elements Q1 of the first switching circuit 4, has been described. However, when a malfunction has occurred in the semiconductor switching elements Q2 of the second switching circuit 5, this case is different from the above case in that the operation (see FIG. 5) of causing an OFF operation (soft blocking) of the semiconductor switching element Q2 connected in series to the malfunctioning semiconductor switching element Q2, is not involved.

As described above, in the present embodiment, the discharge circuit 8 formed of a series body including the resistance 8a and the discharge switch 8b is connected in parallel to the secondary side capacitor 7, and further, the bypass switch 9 is connected in parallel to the resistance 8a in the discharge circuit 8. When the malfunction detection unit 32 for the gate driving circuit 30a, 30b detects a malfunction in the semiconductor switching elements Q1, Q2 in the submodule 10, the control circuit 20 controls all the semiconductor switching elements Q1 in the first switching circuit 4 to the OFF state, controls the discharge switch 8b to discharge the capacitor 7, and subsequently, controls the bypass switch 9 to cause a short circuit between the secondary side terminals 2a, 2b. Accordingly, control to reliably disconnect the input/output of the submodule 10 from the entire power conversion device 100 and to bypass the submodule 10 can be performed, and thus, the operation of the power conversion device 100 can be continued with use of the remaining sound submodules 10.

It is noted that, when the gate drive circuit includes the malfunction detection unit 32 in at least one of the semiconductor switching elements Q1, Q2 of the legs of the first and second switching circuits 4, 5, a short-circuit current in the leg can be detected.

Further, in the above embodiment, the example of the malfunction detection unit 32 that detects a short-circuit current has been described. However, the malfunction detection unit 32 can also detect other malfunctions, such as a malfunction that the semiconductor switching elements Q1, Q2 are not turned ON irrespective of input of an ON signal thereto, and the same effect can be provided.

Moreover, in the above embodiment, single-phase full-bridge circuits are used for the first and second switching circuits 4, 5 of the submodules 10. Alternatively, three-phase bridge circuits may be used.

Figure 8:
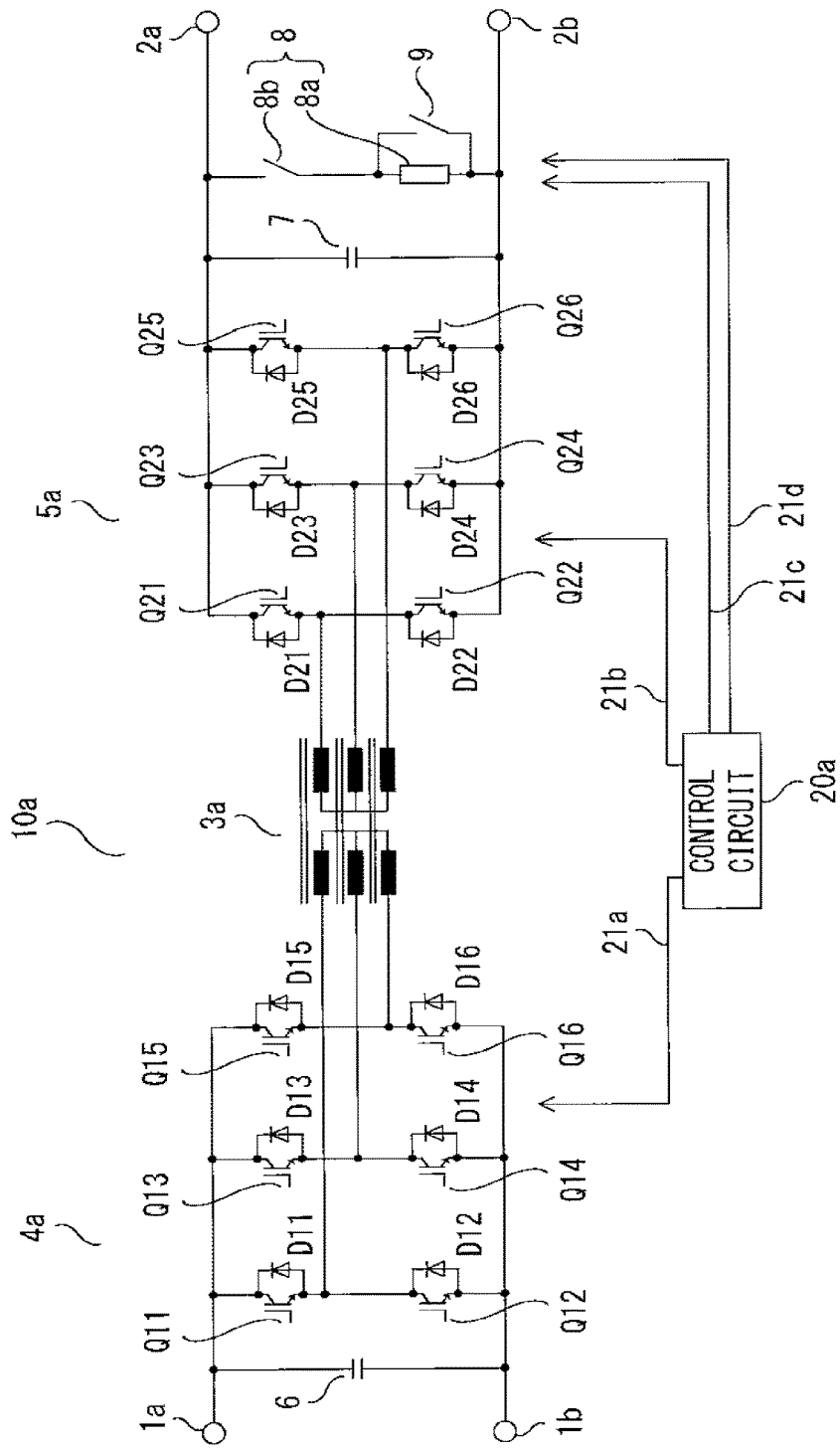
FIG. 8 is a circuit diagram showing the configuration of a submodule according to a modification of the first embodiment of the present invention.

FIG. 8 is a circuit diagram showing the configuration of a submodule 10a according to a modification of the first embodiment of the present invention. As shown in FIG. 8, the submodule 10a includes a three-phase transformer 3a, first and second switching circuits 4a, 5a, and the capacitors 6, 7, and further includes a discharge circuit 8 and a bypass switch 9 identical to those of the above first embodiment. The submodule 10a further includes a control circuit 20a. As in the above first embodiment, the control circuit 20a generates the drive signals 21a, 21b to control the first switching circuit 4a and the second switching circuit 5a, and generates the control signals 21c, 21d to control the conductive states of the discharge switch 8b in the discharge circuit 8 and the bypass switch 9.

The first switching circuit 4a is a three-phase bridge circuit having a plurality of semiconductor switching elements Q11 to Q16 (hereinafter, simply referred to as Q11 to Q16, or semiconductor switching elements Q1) connected in antiparallel to diodes D11 to D16, respectively, and is formed of three legs (Q11, Q12), (Q13, Q14), (Q15, Q16) obtained by connecting the two semiconductor switching elements Q1 in series for each phase. Both ends (DC ends) of each of the legs are connected to the capacitor 6, and the intermediate point (AC end) of each of the legs is connected to a primary winding of the transformer 3a.

The second switching circuit 5a is a three-phase bridge circuit having a plurality of semiconductor switching elements Q21 to Q26 (hereinafter, simply referred to as Q21 to Q26, or semiconductor switching elements Q2) connected in antiparallel to diodes D21 to D26, respectively, and is formed of three legs (Q21, Q22), (Q23, Q24), (Q25, Q26) obtained by connecting the two semiconductor switching elements Q2 in series for each phase. Both ends (DC ends) of each of the legs are connected to the capacitor 7, and the intermediate point (AC end) of each of the legs is connected to a secondary winding of the transformer 3a.

In addition, the gate driving circuits 30a, 30b of the respective semiconductor switching elements Q1, Q2 have configurations identical to those of the above first embodiment.

Also in the submodule 10a having the above configuration, when a malfunction is detected in the semiconductor switching elements Q1, Q2, the control circuit 20a controls all the semiconductor switching elements Q1 in the first switching circuit 4a to the OFF states, and the bypass switch 9 to cause a short circuit between the secondary side terminals 2a, 2b after controlling the discharge switch 8b to discharge the capacitor 7. Accordingly, control to reliably disconnect the input and output of a submodule 10a from the entire power conversion device 100 and to bypass the submodule 10a can be performed so that the operation of the power conversion device 100 can be continued by use of the remaining sound submodules 10a.

Second Embodiment

Next, the second embodiment of the present invention is described.

In the above first embodiment, the bypass switch 9 for bypassing the capacitor 7 is connected in parallel to the resistance 8a of the discharge circuit 8. The second embodiment has a different connection structure for a bypass switch.

Figure 9:
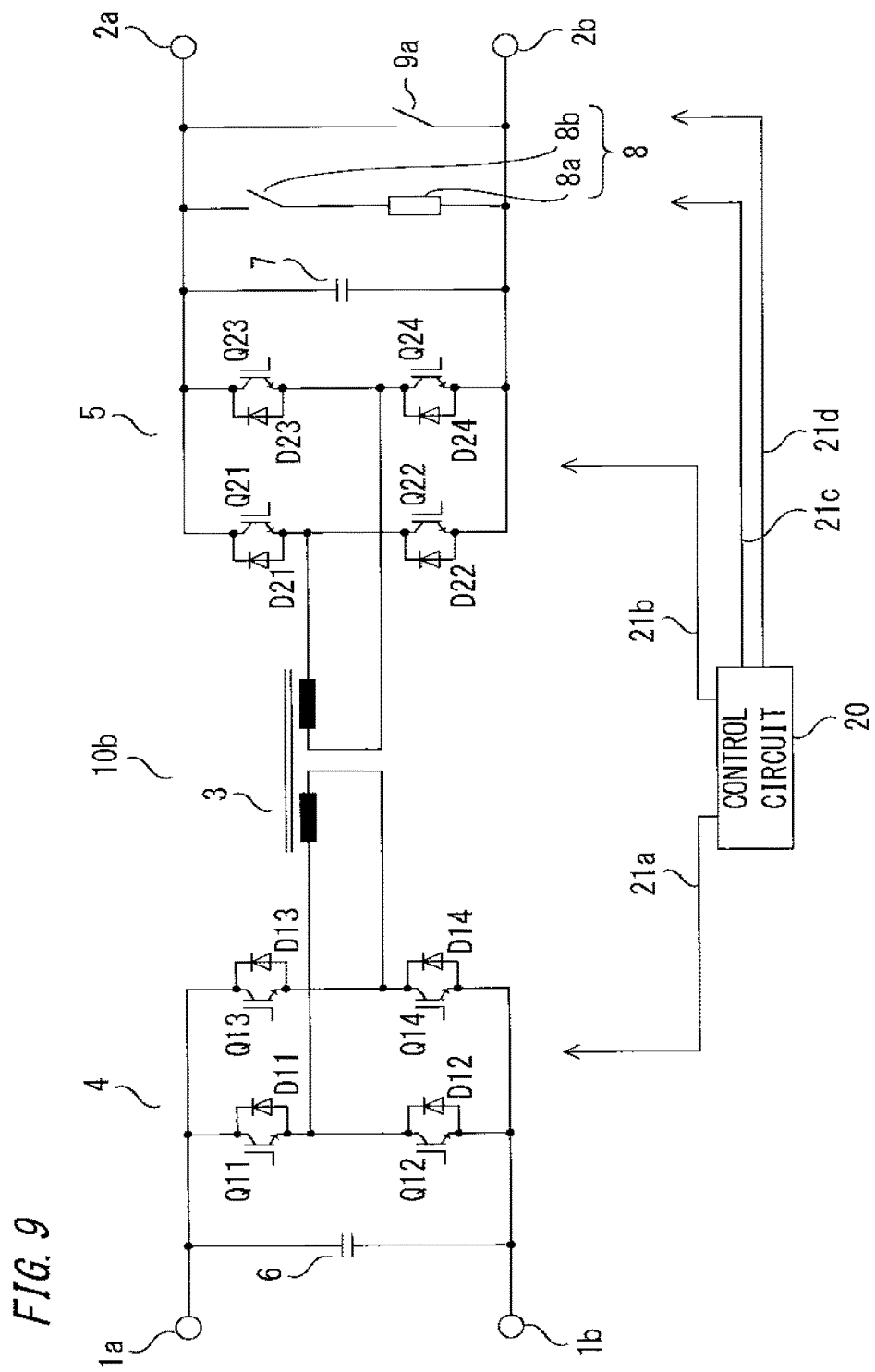
FIG. 9 is a circuit diagram showing the configuration of a submodule according to the second embodiment of the present invention.

FIG. 9 is a circuit diagram showing the detailed configuration of a submodule 10b in the power conversion device 100 of the second embodiment. As shown in FIG. 9, a bypass switch 9a is connected in parallel to the secondary side capacitor 7. Namely, the capacitor 7, the discharge circuit 8 formed of a series body including the resistance 8a and the discharge switch 8b, and the bypass switch 9a are connected in parallel with one another between the secondary side terminals 2a, 2b.

The other components are the same as those of the submodule 10 of the above first embodiment.

When a malfunction occurs in the semiconductor switching elements Q1, Q2 during a normal operation of the submodule 10b, the control circuit 20 receives the detection signal 40, determines that the submodule 10b has malfunctioned, controls all the semiconductor switching elements Q1, Q2 to the OFF states, and controls the discharge switch 8b of the discharge circuit 8 to the conductive state. As a result, the capacitor 7 is discharged through the discharge circuit 8. When discharge of the capacitor 7 is completed, the control circuit 20 controls the bypass switch 9a to the conductive state. As a result, a short circuit is caused between the secondary side terminals 2a, 2b via the bypass switch 9a, and the capacitor 7 is bypassed.

In the present embodiment, a bypass route for bypassing the capacitor 7 is formed of only the bypass switch 9a.

Consequently, unlike the first embodiment, when the bypass switch 9a enters the conductive state, the conductive state of the discharge switch 8b does not need to be maintained. Therefore, the discharge switch 8b not having a function of being latched onto the conductive state may be used, and the control circuit 20 performs control to maintain the conductive state of the discharge switch 8b for a time longer than the discharge time of the capacitor 7. Accordingly, a small, light, and inexpensive semiconductor switch can be used for the discharge switch 8b so that downsizing and weight reduction of the submodule 10b and the power conversion device 100 can be achieved.

Also in the second embodiment, when a malfunction is detected in the semiconductor switching elements Q1, Q2, the control circuit 20 controls all the semiconductor switching elements Q1 in the first switching circuit 4a to the OFF states, and controls the bypass switch 9a to cause a short circuit between the secondary side terminals 2a, 2b after controlling the discharge switch 8b to discharge the capacitor 7. Accordingly, control to reliably disconnect the input and output of the submodule 10b from the entire power conversion device 100 and to bypass the submodule 10b can be performed so that the operation of the power conversion device 100 can be continued by use of the remaining sound submodules 10b.

In addition, since the bypass route for bypassing the capacitor 7 is formed of only the bypass switch 9a, the malfunctioning submodule 10b is more reliably bypassed and the continuous operation using the remaining sound submodules 10b is performed.

It is noted that, also in the present embodiment, when the submodule 10b malfunctions, the other sound submodules 10b operate so as to compensate for the output voltage or transmission power of the submodule 10b, as in the above first embodiment. Accordingly, a desired operation of the power conversion device 100 can be continued.

Also in the above second embodiment, three-phase bridge circuits may be used for the first and second switching circuits of a submodule.

Figure 10:
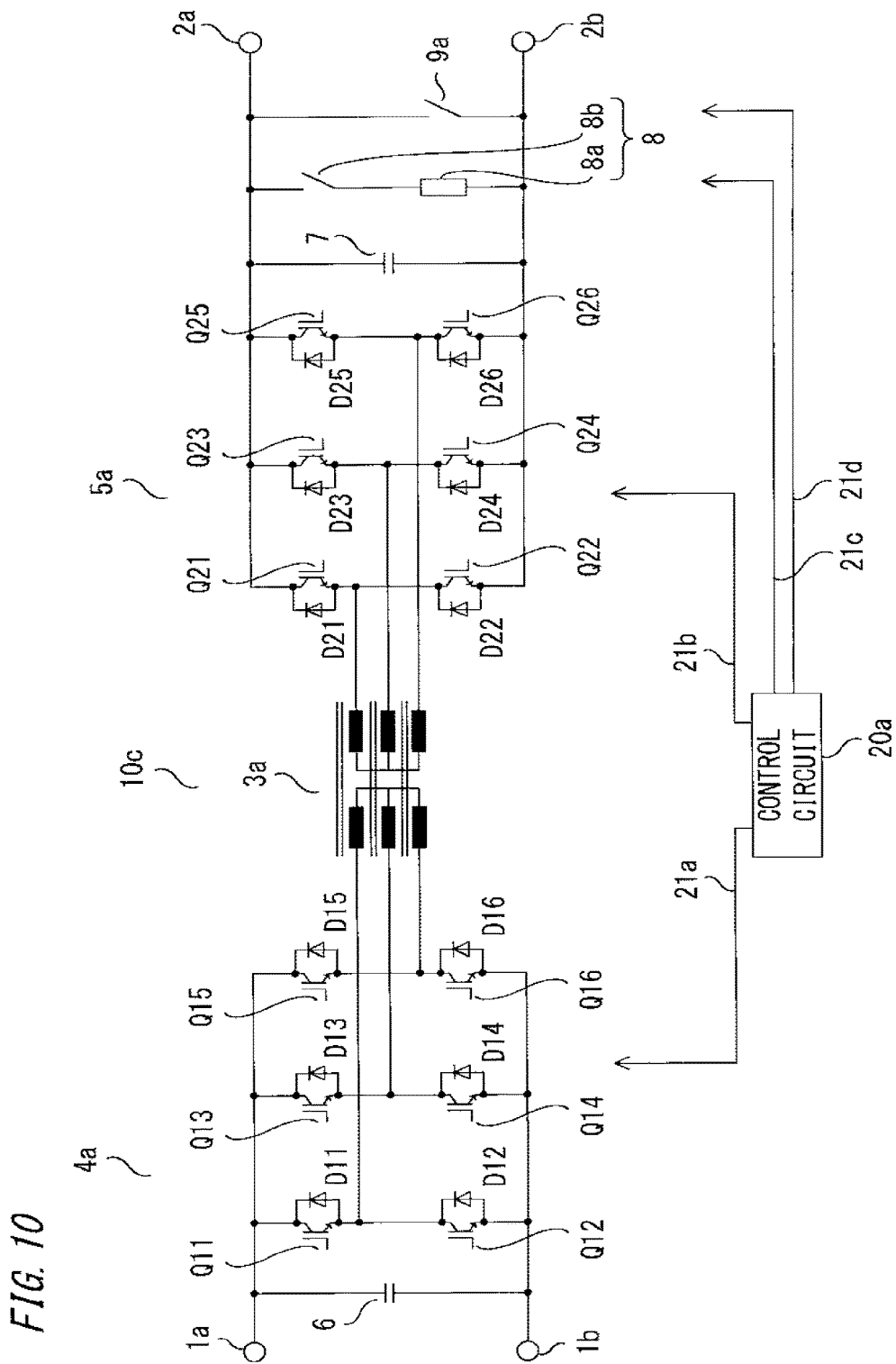
FIG. 10 is a circuit diagram showing the configuration of a submodule according to a modification of the second embodiment of the present invention.

FIG. 10 is a circuit diagram showing the configuration of a submodule 10c according to a modification of the second embodiment of the present invention. As shown in FIG. 10, the submodule 10c includes the three-phase transformer 3a, the first and second switching circuits 4a, 5a each formed of a three-phase bridge circuit, and the capacitors 6, 7, and further includes the discharge circuit 8 and the bypass switch 9a identical to those of the above second embodiment. The submodule 10c further includes a control circuit 20a. As in the above second embodiment, the control circuit 20a generates the drive signals 21a, 21b to control the first switching circuit 4a and the second switching circuit 5a, and generates the control signals 21c, 21d to control the conductive states of the discharge switch 8b in the discharge circuit 8 and the bypass switch 9a.

Also in this case, the power conversion device 100 operates as in the above second embodiment so that the input and output of the submodule 10c where a malfunction has occurred are reliably disconnected from the entire power conversion device 100, whereby the operation using the remaining sound submodules 10c can be performed.

Third Embodiment

Next, the third embodiment of the present invention is described.

Figure 11:
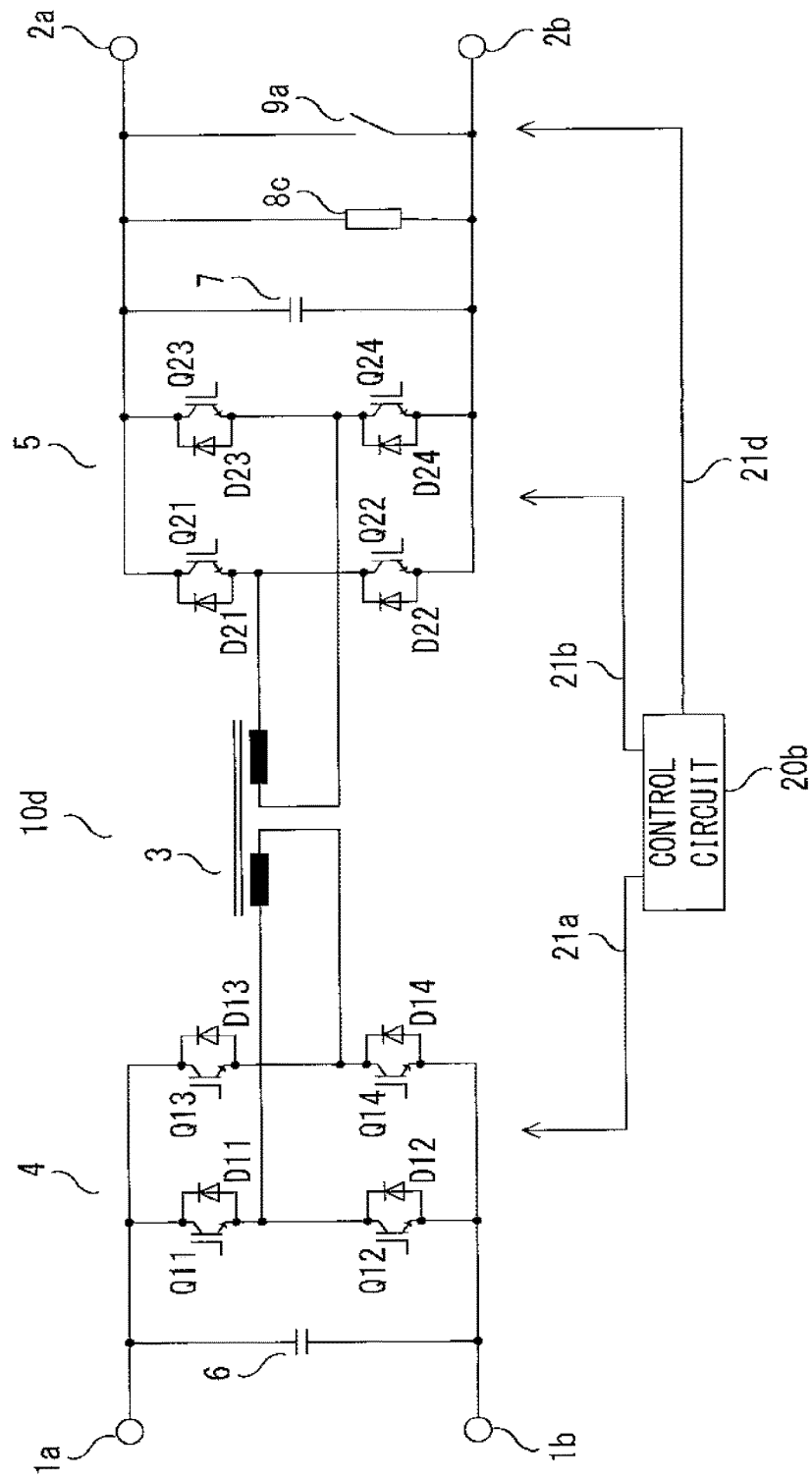
FIG. 11 is a circuit diagram showing the configuration of a submodule according to the third embodiment of the present invention.

FIG. 11 is a circuit diagram showing the detailed configuration of a submodule 10d in the power conversion device 100 of the third embodiment. In the present embodiment, a discharge circuit is formed of a resistance 8c only and is provided with no discharge switch.

As shown in FIG. 11, the capacitor 7, the resistance 8c, and the bypass switch 9a are connected in parallel between the secondary side terminals 2a, 2b. A control circuit 20b generates the drive signals 21a, 21b to control the first switching circuit 4 and the second switching circuit 5, and generates the control signal 21d to control the conductive state of the bypass switch 9a.

The other components are the same as those of the submodule 10b of the second embodiment.

In this case, the resistance 8c is connected in parallel to the secondary side capacitor 7 at all times. Therefore, in order to reduce a loss during a steady state, that is, the normal operation state of the submodule 10d, the resistance value of the resistance 8c is set larger than that of the resistance 8a in the discharge circuit 8 of the above first or second embodiment. When a malfunction occurs in the semiconductor switching elements Q1, Q2 during the normal operation of the submodule 10d, the control circuit 20b receives the detection signal 40, determines that the submodule 10d has malfunctioned, and controls all the semiconductor switching elements Q1, Q2 to the OFF states. When the operation of the submodule 10d is halted, the capacitor 7 is continuously discharged through the resistance 8c, and is completely discharged in the end. Namely, a certain time is required, but discharge can be performed without use of a discharge switch.

When discharge of the capacitor 7 is completed, the control circuit 20b controls the bypass switch 9a to the conductive state. Accordingly, a short circuit is caused between the secondary side terminals 2a, 2b via the bypass switch 9a so that the capacitor 7 is bypassed.

Also in the third embodiment, when a malfunction has been detected in the semiconductor switching elements Q1, Q2, the control circuit 20b controls all the semiconductor switching elements Q1 of the first switching circuit 4 to the OFF states, and, after discharge of the capacitor 7 by the resistance 8c, controls the bypass switch 9a to cause a short circuit between the secondary side terminals 2a, 2b. Accordingly, the input and output of the submodule 10d can be reliably disconnected from the entire power conversion device 100 so as to be bypassed. Thus, the operation of the power conversion device 100 can be continued by use of the remaining sound submodules 10d.

In addition, since the bypass route for bypassing the capacitor 7 is formed of the bypass switch 9a only, the malfunctioning submodule 10d can be more reliably bypassed, whereby the same effect as that in the above second embodiment is provided. Moreover, since the discharge circuit is formed of the resistance 8c only without provision of a discharge switch, downsizing and weight reduction of the submodule 10d and the power conversion device 100 can be achieved.

It is noted that, also in the present embodiment, when the submodule 10d malfunctions, the remaining sound submodules 10d operate so as to compensate for the output voltage or transmission power of the malfunctioning submodule 10d as in the above first embodiment. Accordingly, a desired operation of the power conversion device 100 can be continued.

Figure 12:
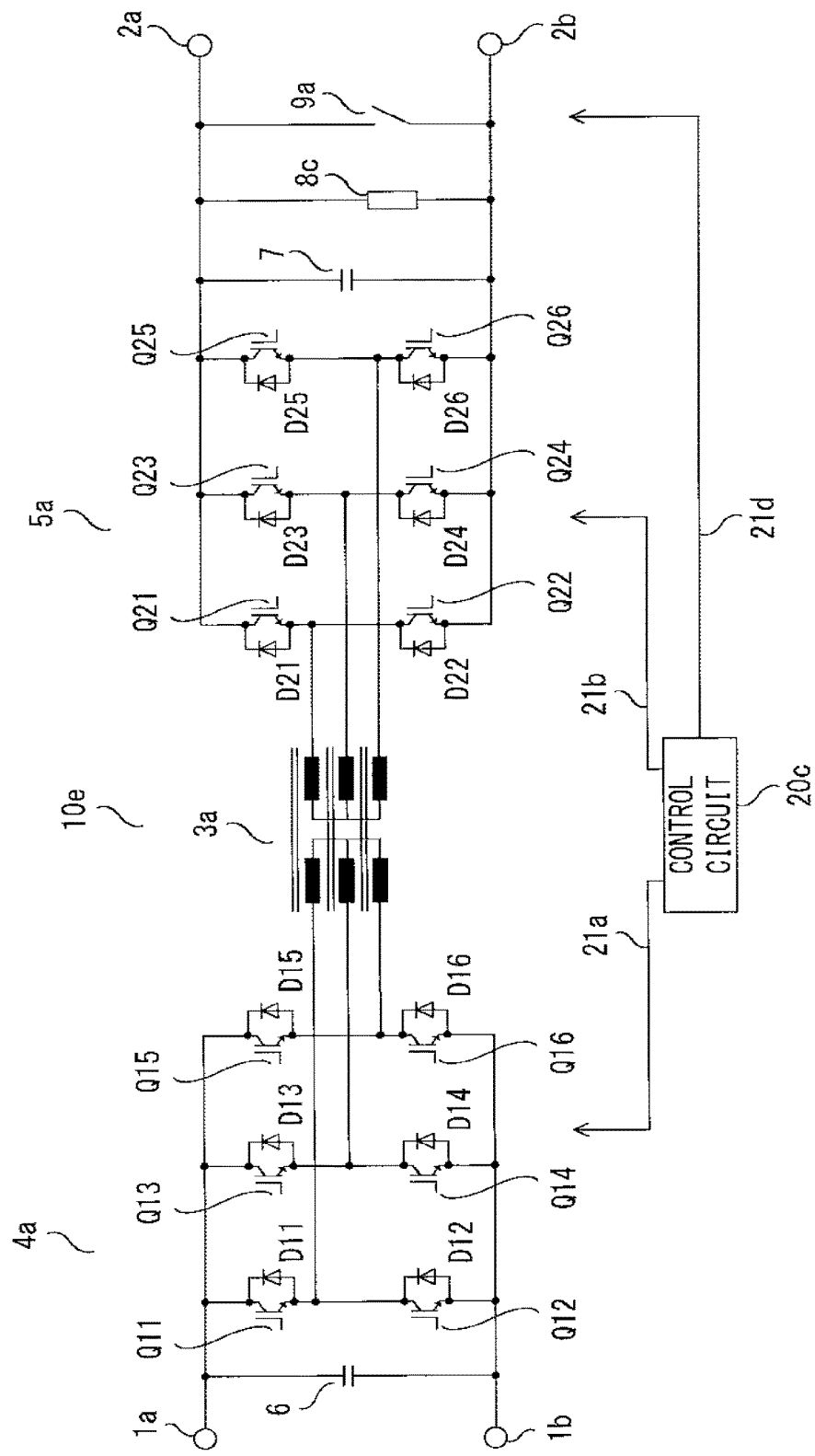
FIG. 12 is a circuit diagram showing the configuration of a submodule according to a modification of the third embodiment of the present invention.

Also in the third embodiment, three-phase bridge circuits may be used for the first and second switching circuits 4a, 5a of the submodule 10e, as shown in FIG. 12. This provides the same effect.

Fourth Embodiment

Figure 13:
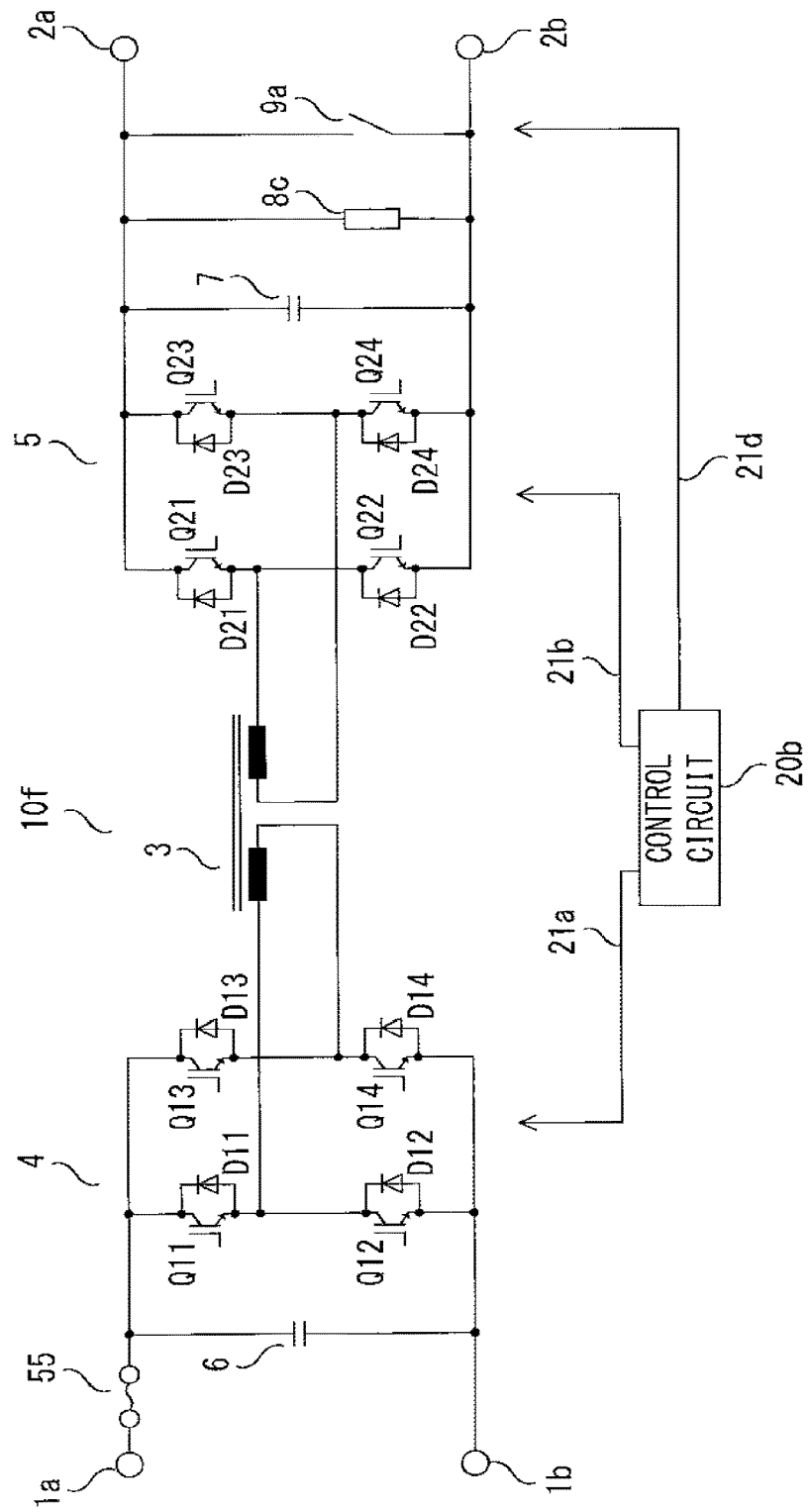
FIG. 13 is a circuit diagram showing the configuration of a submodule according to the fourth embodiment of the present invention.

Next, the fourth embodiment of the present invention is described. FIG. 13 is a circuit diagram showing the detailed configuration of a submodule 10f in the power conversion device 100 of the fourth embodiment. Since the fourth embodiment is similar to the third embodiment described above, the difference of the fourth embodiment from the third embodiment is mainly described below.

The fourth embodiment includes an open path unit 55 between the first switching circuit 4 and the primary side terminal 1a. Specifically, as shown in FIG. 13, the open path unit 55 is connected between the capacitor 6 and the primary side terminal 1a. A configuration using a fuse for the open path unit 55 is shown in FIG. 13. However, a configuration using a breaker may be used. The open path unit 55 is provided on at least one of the two primary side terminals 1a, 1b.

In each of the first to third embodiments described above, when any one of the semiconductor switching elements Q1 in the first switching circuit 4 has malfunctioned, the sound semiconductor switching elements Q1 are turned OFF through the arm short circuit protection before malfunctioning, whereby the sound semiconductor switching elements Q1 are protected from an overcurrent. As a result, a short-circuited state is eliminated. However, when two or more of the semiconductor switching elements Q1 in the first switching circuit 4 simultaneously malfunction, and when the arm short circuit fails to function, the short-circuited state of the capacitor 6 cannot be eliminated.

In the fourth embodiment, the open path unit 55 for cutting off a current when an overcurrent occurs is provided between the capacitor 6 and the primary side terminal 1a. As a result of provision of the open path unit 55, the first switching circuit 4 is disconnected from the primary side terminals 1a, 1b at the time of occurrence of an overcurrent. Consequently, when two or more of the semiconductor switching elements Q1 of the first switching circuit 4 simultaneously malfunction and when the arm short circuit fails to function, a short-circuited state in which an overcurrent flows can be reliably eliminated. The configurations other than the open path unit 55 are the same as those in the third embodiment.

Although the fourth embodiment is similar to the third embodiment, the configuration of the open path unit 55 is applicable to each of the first embodiment and the second embodiment. Also in this case, the same effect as in the fourth embodiment can be provided.

Figure 14:
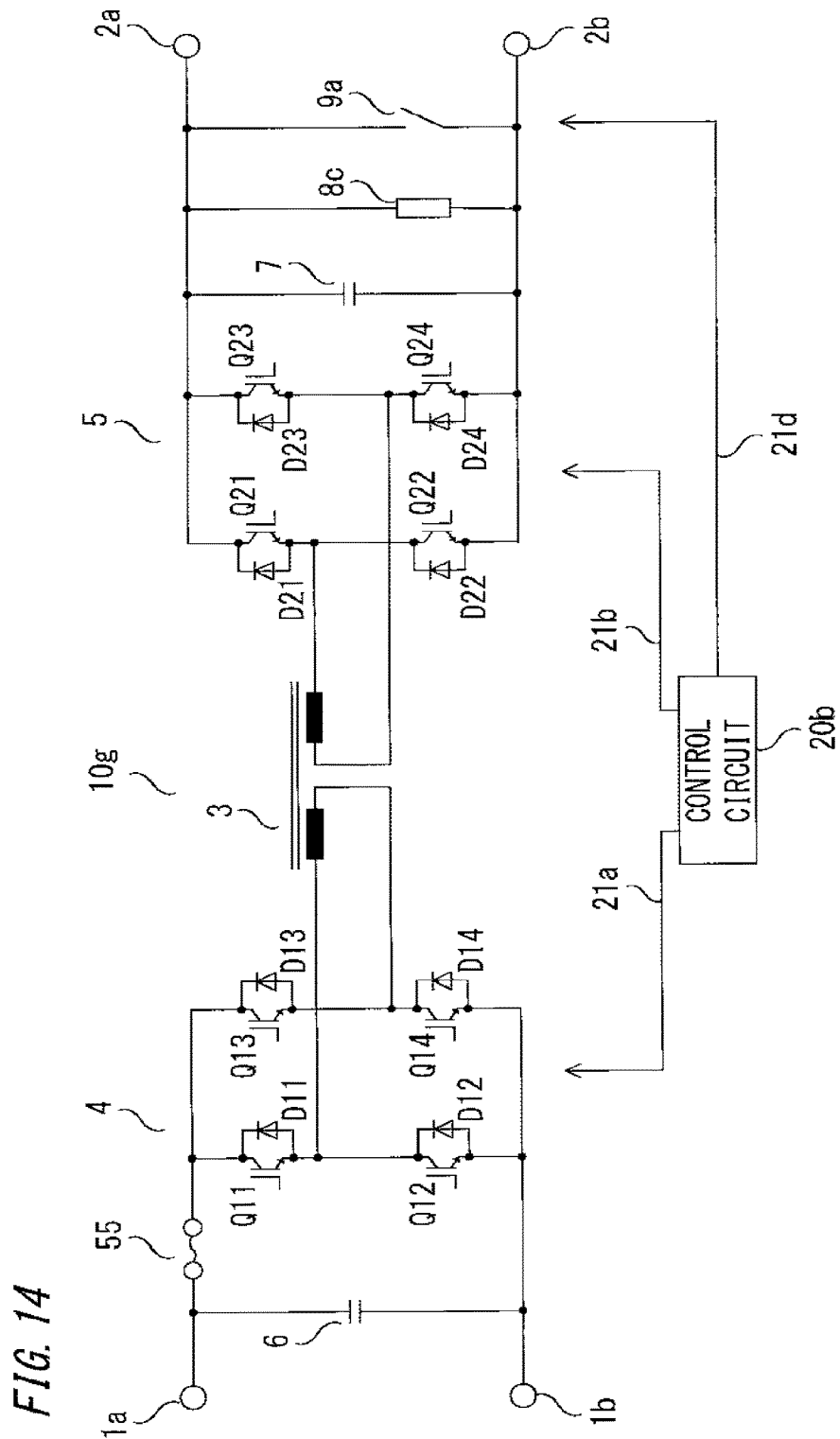
FIG. 14 is a circuit diagram showing the configuration of a submodule according to a modification of the fourth embodiment of the present invention.

FIG. 14 is a circuit diagram showing the detailed configuration of a submodule log in the power conversion device 100 according to a modification of the fourth embodiment of the present invention. As shown in FIG. 14, the open path unit 55 may be connected between the first switching circuit 4 and the capacitor 6. Also in the fourth embodiment, three-phase bridge circuits may be used for the submodules 10f, 10g. Although the fourth embodiment is configured to include the bypass switch 9a, not the bypass switch 9a but the discharge circuit 8 formed of the series body including the resistance 8a and the discharge switch 8b may be included as in the first embodiment. When the three-phase bridge circuits are used and when the configuration from the second switching circuit 5 to the secondary side terminals 2a, 2b is the same as that of the first embodiment, provision of the open path unit 55 realizes the same effect as in the above fourth embodiment is provided.

It is noted that, within the scope of the present invention, the above embodiments may be freely combined with each other, or each of the above embodiments may be modified or simplified as appropriate.

The invention claimed is:

1. A power conversion device having a plurality of DC/DC converters, primary side terminals of which are connected in parallel and secondary side terminals of which are connected in series, the DC/DC converters each comprising:
    a transformer;
    a first switching circuit formed of a bridge circuit including a plurality of legs having a plurality of semiconductor switching elements to which antiparallel diodes are respectively connected, the first switching circuit being connected between the primary side terminals and a primary winding of the transformer so as to perform DC/AC power conversion;
    a second switching circuit formed of a bridge circuit including a plurality of legs having a plurality of semiconductor switching elements to which antiparallel diodes are respectively connected, the second switching circuit being connected between the secondary side terminals and a secondary winding of the transformer so as to perform DC/AC power conversion;
    a capacitor connected in parallel to the secondary side terminals; and
    a control circuit for controlling an output of the corresponding DC/DC converter, wherein
    each of the DC/DC converters further includes a discharge circuit connected in parallel to the capacitor so as to discharge power of the capacitor, a bypass switch for bypassing the capacitor by causing a short-circuit between the secondary side terminals, and a malfunction detection unit which is provided in a gate drive circuit of at least one of the semiconductor switching elements of each of the legs in the first and second switching circuits and which detects a malfunction in the semiconductor switching element, and
    in each of the DC/DC converters, when the malfunction detection unit detects the malfunction in the semiconductor switching element, the control circuit turns OFF all of the semiconductor switching elements in the first switching circuit, and controls the bypass switch to a conductive state after discharge of the capacitor through the discharge circuit, so as to cause a short circuit between the secondary side terminals.

2. The power conversion device according to claim 1, wherein
    the malfunction detection unit detects, as the malfunction, a short circuit of two arms of the leg.

3. The power conversion device according to claim 2, wherein
    in the first switching circuit, the gate drive circuit including the malfunction detection unit, includes a blocking unit that blocks the semiconductor switching element.

4. The power conversion device according to claim 3, wherein
    the discharge circuit is formed of a series body including a resistance and a discharge switch, and
    when the malfunction detection unit detects the malfunction in the semiconductor switching element, the control circuit controls the discharge switch to a conductive state so as to discharge the capacitor.

5. The power conversion device according to claim 3, wherein the discharge circuit is formed of a resistance connected in parallel to the capacitor.

6. The power conversion device according to claim 2, wherein
the discharge circuit is formed of a series body including a resistance and a discharge switch, and
when the malfunction detection unit detects the malfunction in the semiconductor switching element, the control circuit controls the discharge switch to a conductive state so as to discharge the capacitor.

7. The power conversion device according to claim 2, wherein
the discharge circuit is formed of a resistance connected in parallel to the capacitor.

8. The power conversion device according to claim 2, wherein
the bypass switch is connected in parallel to the capacitor.

9. The power conversion device according to claim 2, wherein
when the malfunction detection unit detects the malfunction in the semiconductor switching element, all of the semiconductor switching elements in the first switching circuit, excluding the semiconductor switching element where the malfunction has been detected, are turned OFF.

10. The power conversion device according to claim 1, wherein
the discharge circuit is formed of a series body including a resistance and a discharge switch, and
when the malfunction detection unit detects the malfunction in the semiconductor switching element, the control circuit controls the discharge switch to a conductive state so as to discharge the capacitor.

11. The power conversion device according to claim 10, wherein
the bypass switch is connected in parallel to the resistance, and
after controlling the discharge switch to a conductive state so as to discharge the capacitor, the control circuit further controls the bypass switch to a conductive state so as to cause a short circuit between the secondary side terminals via the discharge switch and the bypass switch.

12. The power conversion device according to claim 1, wherein
the discharge circuit is formed of a resistance connected in parallel to the capacitor.

13. The power conversion device according to claim 1, wherein
the bypass switch is connected in parallel to the capacitor.

14. The power conversion device according to claim 1, wherein
when the malfunction detection unit detects the malfunction in the semiconductor switching element, all of the semiconductor switching elements in the first switching circuit, excluding the semiconductor switching element where the malfunction has been detected, are turned OFF.

15. The power conversion device according to claim 1, wherein
the control circuit controls the bypass switch to a conductive state after discharge of the capacitor is completed.

16. The power conversion device according to claim 1, wherein
the semiconductor switching elements in the second switching circuit are provided with an explosion proof structure.

17. The power conversion device according to claim 1, wherein
the control circuit in each of the plurality of DC/DC converters increases terminal voltages at the secondary side terminals of the DC/DC converter when the malfunction is detected in another one of the DC/DC converters such that reduction of the entire output voltage is compensated for.

18. The power conversion device according to claim 1, wherein
the control circuit in each of the plurality of DC/DC converters increases transmission power of the DC/DC converter when the malfunction is detected in another one of the DC/DC converters such that reduction of the entire transmission power is compensated for.

19. The power conversion device according to claim 1, wherein
an open path unit for cutting off a current when an overcurrent flows is provided between the first switching circuit and the primary side terminals.

20. The power conversion device according to claim 19, wherein
the open path unit is formed of a fuse.

* * * * *